(12) United States Patent
Ancimer et al.

(10) Patent No.: US 7,444,231 B2
(45) Date of Patent: Oct. 28, 2008

(54) METHOD OF MOUNTING AN ACCELEROMETER ON AN INTERNAL COMBUSTION ENGINE AND INCREASING SIGNAL-TO-NOISE RATIO

(75) Inventors: Richard Ancimer, Vancouver (CA); Duran Cheung, Vancouver (CA)

(73) Assignee: Westport Power Inc., Vancouver, BC (CA)

( * ) Notice: Subject to any disclaimer, the term of this patent is extended or adjusted under 35 U.S.C. 154(b) by 0 days.

(21) Appl. No.: 11/695,474

(22) Filed: Apr. 2, 2007

(65) Prior Publication Data
US 2008/0035108 A1 Feb. 14, 2008

Related U.S. Application Data

(63) Continuation-in-part of application No. 11/283,156, filed on Nov. 18, 2005, now Pat. No. 7,200,487.

(60) Provisional application No. 60/629,489, filed on Nov. 18, 2004.

(51) Int. Cl.
*F02P 5/00* (2006.01)
*G01M 15/00* (2006.01)

(52) U.S. Cl. ............. 701/111; 123/406.21; 73/114.02

(58) Field of Classification Search .......... 701/111, 701/106, 107, 114, 115; 123/479, 480, 435, 123/501, 502, 406.21, 406.22; 73/115, 116, 73/117.2, 117.3, 118.1, 35.03, 35.07, 35.08, 73/35.09, 114.02, 114.07
See application file for complete search history.

(56) References Cited

U.S. PATENT DOCUMENTS 4,829,956 A * 5/1989 Rehn et al. ............ 123/198 DB

| | | |
|---|---|---|
| 5,050,566 A | 9/1991 | Distelrath et al. |
| 5,136,998 A * | 8/1992 | Deutsch .................. 123/406.4 |
| 5,150,682 A * | 9/1992 | Magnet ..................... 123/25 J |
| 5,789,667 A | 8/1998 | Leader et al. |

(Continued)

FOREIGN PATENT DOCUMENTS

DE 40 02 228 A1 8/1991

(Continued)

OTHER PUBLICATIONS

Kim et al., "Cepstral Analysis As A Tool for Robust Processing, Deverberation And Detection Of Transients", *Mechanical Systems and Signal Processing*, 1992, pp. 1-15, vol. 6, No. 1.

(Continued)

*Primary Examiner*—Willis R. Wolfe, Jr.
*Assistant Examiner*—Johnny H. Hoang
(74) *Attorney, Agent, or Firm*—McAndrews, Held & Malloy, Ltd.

(57) ABSTRACT

A method of mounting an accelerometer to an internal combustion engine comprises securing the accelerometer to a mating surface on an engine component external to a combustion chamber where the accelerometer can generate a signal output that is characteristic of engine knock, when it occurs, and at least one other combustion behavior inside the combustion chamber during a combustion event. The method further comprises connecting a signal wire at one end to the accelerometer and at an opposite end to a signal processor, and increasing the signal output's signal-to-noise ratio.

61 Claims, 8 Drawing Sheets

U.S. PATENT DOCUMENTS

| | | | |
|---|---|---|---|
| 5,797,360 A * | 8/1998 | Pischinger et al. | 123/90.11 |
| 6,082,326 A * | 7/2000 | Schietecatte et al. | 123/299 |
| 6,161,523 A | 12/2000 | Unland et al. | |
| 6,273,064 B1 | 8/2001 | Scholl et al. | |
| 6,408,819 B1 | 6/2002 | Mezger et al. | |
| 6,494,186 B1 * | 12/2002 | Wakeman | 123/479 |
| 6,598,468 B2 | 7/2003 | Zur Loye et al. | |
| 6,688,286 B2 | 2/2004 | Kokubo et al. | |
| 6,840,218 B2 | 1/2005 | Scholl et al. | |
| 6,945,229 B1 * | 9/2005 | Zhu et al. | 123/406.21 |
| 7,092,812 B2 * | 8/2006 | Panciroli | 701/101 |
| 2004/0260454 A1 * | 12/2004 | Basir | 701/111 |

FOREIGN PATENT DOCUMENTS

| | | |
|---|---|---|
| DE | 43 41 796 A1 | 9/1995 |
| EP | 1106805 A1 | 6/2001 |
| EP | 1302650 A2 | 4/2003 |
| JP | 02-221664 | 9/1990 |
| JP | 04-331329 | 11/1992 |
| JP | 09-144583 | 6/1997 |
| JP | 2003-003883 | 1/2003 |
| JP | 2005-120896 | 5/2005 |
| WO | WO 91/11602 | 8/1991 |
| WO | WO 95/16196 | 6/1995 |
| WO | WO 03/016698 A1 | 2/2003 |
| WO | WO 2006/053438 | 5/2006 |

OTHER PUBLICATIONS

Molinaro et al., "Signal processing pattern classification techniques to improve knock detection in spark ignition engines" (abstract), 1995, INSPEC/IEE, No. XP-002296503 (original published in *Mechanical Systems and Signal Processing,* Jan. 1995).

Li et al. "Failure diagnosis system by sound signal for automobile engine" (abstract), INSPEC/IEE, No. XP-00223612 (original published in *Proceedings of the Japan-USA Symposium on Flexible Automation,* 1996, ASME, New York, NY, USA).

* cited by examiner

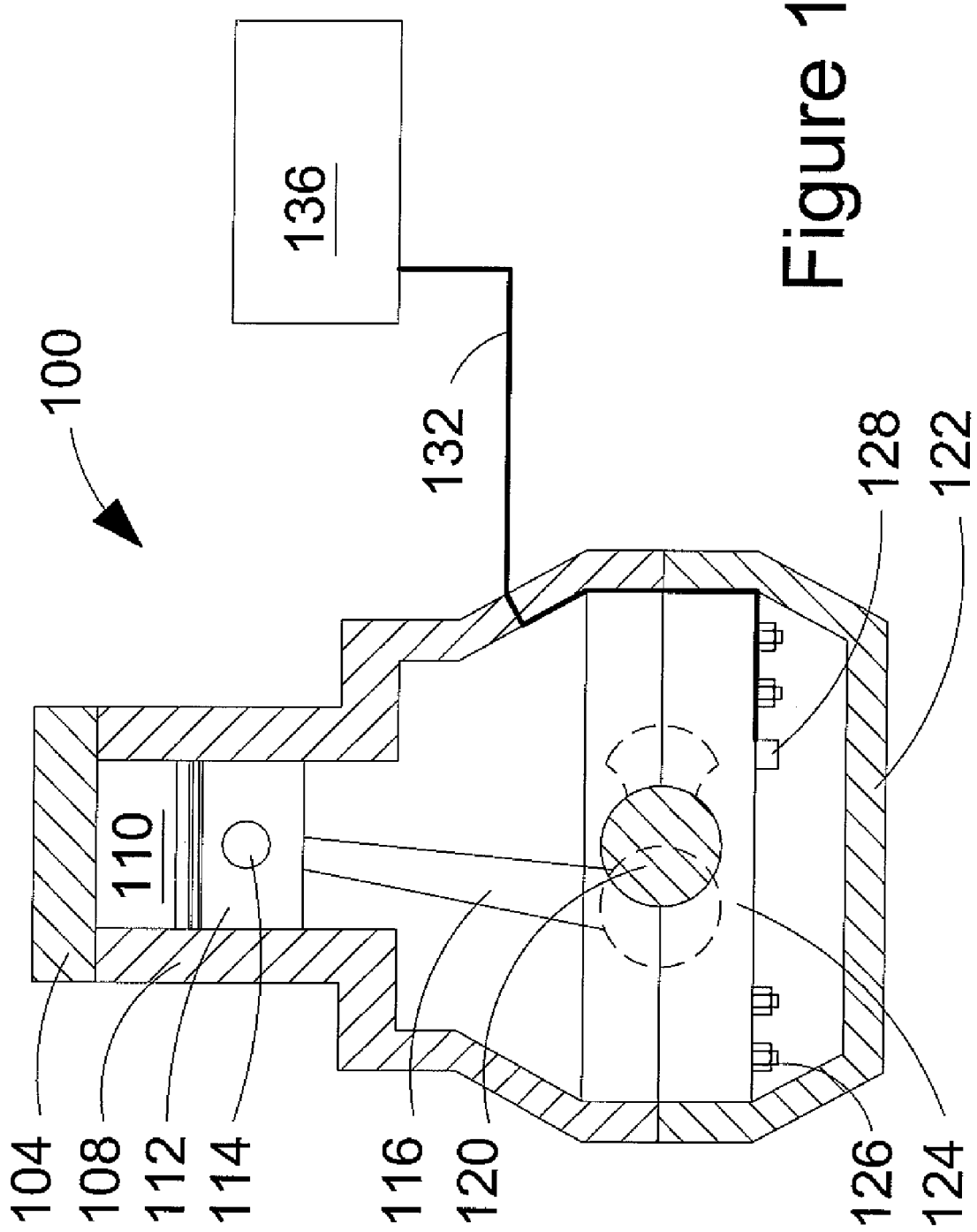

METHOD OF MOUNTING AN ACCELEROMETER ON AN INTERNAL COMBUSTION ENGINE AND INCREASING SIGNAL-TO-NOISE RATIO

CROSS-REFERENCE TO RELATED APPLICATION(S)

This application is a continuation-in-part of U.S. nonprovisional patent application Ser. No. 11/283,156, having a filing date of Nov. 18, 2005 (scheduled to issue as U.S. Pat. No. 7,200,487 on Apr. 3, 2007), entitled "System And Method For Processing An Accelerometer Signal To Assist In Combustion Quality Control In An Internal Combustion Engine", which in turn claimed priority benefits from U.S. provisional patent application Ser. No. 60/629,489, having a filing date of Nov. 18, 2004, entitled, "Accelerometer-Based Combustion Sensor". The '156 nonprovisional application and the '489 provisional application are each hereby incorporated by reference herein in their entirety.

FIELD OF THE INVENTION

The present invention relates to a method of mounting an accelerometer on a component of an internal combustion engine and increasing signal-to-noise ratio of the signal output generated by the accelerometer. More specifically the method relates to generating a signal output that is characteristic of combustion behavior inside the combustion chamber and an engine that employs the method to control or diagnose an engine to improve efficiency and performance and/or reduce engine-out emissions.

BACKGROUND OF THE INVENTION

Accelerometers can be used to detect engine knock. Engine knock can be caused by pre-mature and uncontrolled detonation of the charge inside the combustion chamber, which can be caused, for example if an Otto-Cycle engine has been fueled with a fuel with too low an octane rating, or if spark timing is too advanced, or if deposits in a combustion chamber create hot spots that cause early ignition. In a Diesel-Cycle engine, engine knock can be caused, for example, if fuel injection timing is too early. Engine knock can cause a decrease in engine performance and in severe cases, if not corrected, engine knock can cause serious damage to the engine, including destruction of the pistons, connecting rods, exhaust valves, head gasket and spark plugs or glow plugs. Accelerometers that are employed as "knock sensors" are typically located on an engine's cylinder block and sometimes on the cylinder head. Engine knock correlates to violent combustion events that are not part of normal combustion behavior. Accordingly, engine knock is not a characteristic of combustion behavior that is normally measured in each combustion cycle. Most knock sensors send a base or "no knocking" reference signal to the electronic engine controller and an easily detectable higher signal when engine knock is detected. Because there is a relatively large difference between the reference signal and the signal when engine knock is detected the accuracy of the knock sensor is relatively unimportant. In this respect, knock sensors are specialized to detect only engine knock.

A signal that is characteristic of normal combustion behavior in a combustion cycle contains more information and needs to be much more accurate than a signal that is normally needed from a knock sensor. Beyond guarding against severe engine damage that might be caused by engine knock, more accurate combustion behavior information can be used to better control or diagnose combustion in an internal combustion engine to improve engine performance and efficiency, and/or engine-out emissions. The operation of most types of internal combustion engines can be improved if an engine controller is provided with accurate information about combustion behavior, such as, for example, information about combustion phasing, which includes the timing for the start of combustion ("SOC"), the combustion rate, which includes the heat release rate as one indication of the combustion rate, the in-cylinder pressure, and engine misfiring. With accurate combustion behavior information such as this, engine performance can be improved by adjusting parameters such as, for example, the timing for fuel injection, the fuel injection rate, and the quantity of fuel injected. Furthermore, a particularly useful application for this type of combustion behavior information is what is known as a homogeneous-charge compression-ignition ("HCCI") engine. Although HCCI engines have not yet been widely commercialized, in recent years significant work has been directed to developing such engines because they offer the potential for higher efficiency and lower engine-out emissions compared to conventional compression ignition Diesel-Cycle engines and spark-ignited Otto-Cycle gasoline engines. For example, at highway cruising conditions the Diesel-Cycle engines in Class 8 heavy-duty trucks operate at about 40% brake thermal efficiency, and these heavy trucks typically achieve only about 6 miles per gallon. HCCI engines could improve engine efficiency significantly, giving a gain in fuel economy. For vehicles that use gasoline-based engines, which are even less efficient than their diesel counterparts, the potential fuel savings is greater still. In addition, because of the potentially lower engine-out emissions from HCCI combustion, HCCI engines might allow future diesel-fueled engines to avoid selective catalytic reduction and its complicated and expensive system of multiple catalysts.

One of the main challenges delaying the commercial introduction of HCCI engines is the difficulty in controlling HCCI combustion and a system that generates an accurate signal characteristic of combustion behavior can be used to solve this challenge. For example, a production-ready SOC sensing system could help to enable HCCI combustion over a wide range of conditions. To be successful, such a sensing system should meet the important practical needs of commercial automotive products, namely low cost, reliability and durability.

SUMMARY OF THE INVENTION

A method of mounting an accelerometer to an internal combustion engine comprises the steps of securing the accelerometer to an engine component, connecting a signal wire at one end to the accelerometers and at an opposite end to a signal processor, and increasing signal-to-noise ratio of the signal output from the accelerometer by taking at least one of several steps to reduce signal noise or increase signal strength attributable to the measured combustion behavior.

The step of securing the accelerometer to the engine component comprises mounting the accelerometer to a mating surface on the engine component. The mating surface is located external to the engine's combustion chambers, where the accelerometer can generate a signal output that is characteristic of engine knock, when it occurs, and at least one other combustion behavior inside the combustion chamber during at least a portion of a compression stroke or a combustion stroke associated with the combustion chamber.

The step of increasing the signal output's signal-to-noise ratio comprises taking at least one of the following steps: (i) adapting the mating surface on the engine component to have a surface flatness of no more that 0.002 inches (0.05 millimeters) Total Indicator Reading; (ii) adapting the mating surface on the engine component to have a surface roughness Rz of no more than 16 micro-inches (0.40 micrometers); (iii) anchoring the signal wire to stationary components of the engine, to reduce signal noise that might otherwise be generated by movement of the signal wire; (iv) shielding the signal wire using a conductive sheath or integrated shielding to reduce signal noise; and (v) applying a viscous liquid between the accelerometer and the mating surface before securing the accelerometer and filling voids therebetween with the viscous liquid, thereby increasing stiffness of the connection when the accelerometer is secured to the mating surface. To increase signal-to-noise ratio, a preferred embodiment comprises following all of steps (i) through (v) set out above.

The engine normally has a plurality of combustion chambers and the preferred method further comprises securing a plurality of accelerometers to respective mating surfaces, with each one of the mating surfaces being external to the plurality of combustion chambers and being located where each one of the respective accelerometers can generate a signal output that is characteristic of the combustion behavior inside at least one of the plurality of combustion chambers. The method can further comprise locating at least two accelerometers where they can each generate a respective signal output that is characteristic of the combustion behavior inside one of the plurality of combustion chambers during combustion cycles, and programming the signal processor: to receive a plurality of signal outputs and match combustion behavior data from each one of the plurality of signal outputs to associated ones of the plurality of combustion chambers; and, to produce a combined signal for at least one of the plurality of combustion chambers, by combining combustion behavior data from respective ones of the plurality of signal outputs that are matched to the same combustion chamber.

In such embodiments that comprise a plurality of accelerometers the method can further comprise packaging a plurality of signal wires in a wiring harness wherein one end of each one of the plurality of signal wires is connected to the signal processor and at the other end is connected to one of the plurality of accelerometers.

With the disclosed method, the signal processor can differentiate engine knock from other combustion behaviors by detecting a characteristic frequency associated with engine knock or by detecting a timing for start of combustion that is in a predetermined range characteristic of engine knock.

In a preferred embodiment the at least one combustion behavior that the signal output is characteristic of is combustion rate, which can be indicated by heat release rate. The method can further comprise programming the signal processor to determine a first combustion behavior directly from the signal output and to determine a second combustion behavior from the first combustion behavior. For example, if the first combustion behavior is combustion rate, the method can further comprise using the combustion rate information as a basis for determining the characteristics of a second combustion behavior such as ones selected from the group consisting of combustion phasing, including timing for start of combustion, and in-cylinder pressure, including gross indicated mean effective pressure, engine misfiring, and partial combustion. In still other embodiments the combustion behaviors such as combustion phasing, in-cylinder pressure, engine misfiring, and partial combustion can be determined directly from the accelerometer signal output.

The step of securing the accelerometer to the engine component can comprise securing the accelerometer to one of the engine's main bearing caps or one of the engine's main bearing cap bolts. When mounting the accelerometer on or near the bearing caps, the method preferably further comprises orienting the signal wire connector of the accelerometer so that it is substantially parallel to the main bearing cap axis of symmetry and pointing toward a connector for the signal wire. In other embodiments, the step of securing the accelerometer to the engine component can comprise securing the accelerometer to a cylinder block of the engine, a cylinder head of the engine or to a cylinder head bolt.

Different methods can be used to secure the accelerometer to the engine component. One method comprises securing the accelerometer to the engine component by boring a hole in the engine component through the mating surface, securing a stud in the hole, and securing the accelerometer against the mating surface of the component with the stud. With this method the mating surface of the component is preferably adapted to have a perpendicularity in reference to the centre axis of the hole of no more than 0.002 inches (0.05 millimeters). The hole that is bored into the engine component is preferably tapped so that the stud can be a bolt with threads matched to the threads of the tapped hole.

Another method of securing the accelerometer to the engine component comprises clamping the accelerometer against the mating surface of the engine component. With this method the location of the mating surface is preferably near existing fasteners or a second engine component that can be used to secure a clamp to the engine component and the accelerometer between a clamping member of the clamp and the mating surface. The clamp is preferably manufactured with at least one base member that is attachable to the engine component by the existing fastener or the second engine component, and a clamping member that is removably attached to the base member. With this feature, the accelerometer can be mounted and removed without removing the existing fasteners or the second engine component. By way of example, the existing fasteners that secure the clamp to the engine component can be the main bearing cap bolts that attach a main bearing cap to a main bearing assembly when the mating surface is on the main bearing cap, or the cylinder head bolts when the mating surface is on the cylinder head. If a second engine component is used to attach the clamp, and the mating surface is on the cylinder head, the second engine component can be a spark plug, a glow plug, a fuel injection valve.

Yet another method of securing the accelerometer to the engine component comprises securing a mounting plate to the mating surface of the engine component, the mounting plate having a component-side that is securable to the mating surface of the engine component and an accelerometer-side that is securable to the accelerometer; and securing the accelerometer to the sensor-side of the mounting plate. With this embodiment, the surface flatness and roughness specifications for the mating surface on the engine component are not as important so long as the bond between the engine component and the mounting plate is sufficiently stiff to transmit movements from the engine component to the mounting plate. To reduce signal-to-noise ratio it remains important to manufacture the accelerometer-side of the mounting plate, which is in contact with the accelerometer to have the same degree of flatness and roughness that is required for the engine component mating surface in the direct-mounting methods. The method can further comprise manufacturing the accelerometer-side of the mounting plate to have an accelerometer mating surface and an integrated stud for receiving and attaching the accelerometer to the mounting plate. Like in the direct-mounted embodiment, when a mounting plate is employed, the method preferably comprises adapting the accelerometer mating surface of the mounting plate to have a perpendicularity in reference to the centre axis of the integrated stud of no more than 0.002 inches (0.05 millimeters). The mounting plate can be secured to engine component by welding, brazing, soldering or cementing.

The method of mounting the accelerometer can further comprise steps for re-mounting the accelerometer to achieve consistent signal outputs before and after re-mounting. The method of re-mounting the accelerometer preferably comprises following the same steps that were followed to mount or previously re-mount the accelerometer. Re-mounting preferably includes matching the same orientation for the accelerometer that it had when it was previously mounted.

Also disclosed is an engine system and a method of operating same with the accelerometer mounted thereto using the disclosed method of mounting an accelerometer. The method of operating and controlling the internal combustion engine comprises using the accelerometer to generate a signal output characteristic of engine knock, when it occurs, and the at least one other combustion behavior inside the combustion chamber during a combustion event associated with the combustion chamber. The method uses information that is collected from the signal output to control or diagnose operation of the engine.

A disclosed internal combustion engine comprises an accelerometer secured to a mating surface of an engine component. The mating surface is external to a combustion chamber of the engine and located where the accelerometer can generate a signal output that is characteristic of engine knock, when it occurs, and at least one other combustion behavior inside the combustion chamber during at least a portion of a compression stroke or a combustion stroke associated with the combustion chamber. The mating surface is machined to have a flatness and a surface roughness that increases the signal output's signal-to-noise ratio. A signal processor can receive and process the signal output generated by the accelerometer to detect engine knock when it occurs, and the at least one other combustion behavior. The output signal from the accelerometer can be transmitted from the accelerometer to the signal processor through a signal wire connected at one end to the accelerometer and at an opposite end to the signal processor. The accelerometer is preferably one of a plurality of accelerometers that are secured to respective mating surfaces and each one of the accelerometers has a signal wire connected at one end thereto and at the opposite end to the signal processor.

BRIEF DESCRIPTION OF THE DRAWINGS

FIG. 1 is a schematic of an example of an internal combustion engine with an accelerometer mounted thereon for generating a signal that is characteristic of combustion behavior inside the combustion chamber;

DETAILED DESCRIPTION OF PREFERRED EMBODIMENT(S)

Figure 2A:
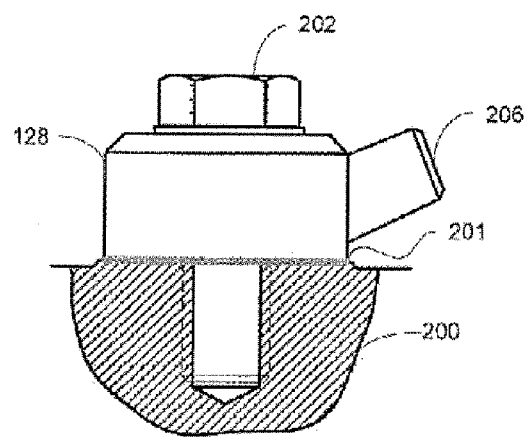
FIG. 2A shows a schematic view illustrating a stud/bolt mounting of an accelerometer according to one embodiment.

An accelerometer is a device for measuring acceleration. Persons skilled in the technology will understand that there are many different types of accelerometers. Accelerometers with a piezoelectric element have been developed for detecting engine knock and such sensors are an example of one type of accelerometer that can be used by the disclosed method for the presently disclosed application. With such sensors, the piezoelectric element produces a charge when a directional force acts on it, and the charge correlates to linear displacement in the direction of the force. Other types of accelerometers, such as surface micromachined capacitive sensors are not known to be commercially available in a form suitable for the presently disclosed application but like other types of accelerometers, they could be adapted to be made in a suitable form for this new application. In preferred embodiments of the method and the disclosed engine, the accelerometer is an electromechanical device that produces a charge, voltage or other electrical signal that is characteristic of its own motion.

While accelerometers have been used to detect engine knock, because of signal noise, originating from vibrations and movements caused by the many moving engine parts in and around the combustion chambers, before the Applicant's work to develop the subject technology, beyond detecting severe combustion events, knock sensors were previously thought to be incapable of generating an accurate signal output, characteristic of more subtle normal combustion behaviors occurring during the combustion cycle. By way of example, in a four stroke engine, the combustion cycle comprises an intake stroke, a compression stroke, a combustion stroke and an exhaust stroke. Depending upon the operating conditions, the commanded timing for start of combustion can change, but combustion can begin during the compression stroke and end during the combustion stroke. The subject invention is described herein with reference to four-stroke engines but persons skilled in engine technology will understand that this invention can also be applied to two-stroke engines.

In preferred embodiments a plurality of accelerometers are mounted to a combustion engine in such a manner and location so as to undergo movement based on engine knock and at least one other combustion behavior inside the combustion chambers during at least a portion of the compression stroke or the combustion stroke associated with the combustion chamber. In this way, at least one accelerometer can, generate a signal characteristic of combustion behavior for each combustion chamber. That is, for the subject invention, the accelerometer need only collect data during at least a portion of the combustion event, and need not collect any data during the intake stroke or the exhaust stroke. Depending upon the combustion behavior that is being determined from the accelerometer signal output, some embodiments of the invention can determine combustion behavior for only a portion of the compression stroke or the combustion stroke. For example, in some engine systems the method and apparatus can be employed to determine the timing for SOC, and in such systems only the first part of the combustion event needs to be monitored. In other engine systems, the method and apparatus can be employed to control the combustion quality during the entire combustion event so that engine operation can be adjusted to reduce engine-out emissions and for such embodiments it is desirable for the accelerometer to deliver a signal output for the portions of the compression and combustion strokes that span the whole combustion event.

Illustrative methods of mounting the accelerometers, illustrative locations for mounting the accelerometers and illustrative methods of re-mounting the accelerometers such that a suitable and consistent signal is generated are outlined below.

Accelerometer Mounting

FIG. 1 is a schematic illustration of an example of the disclosed system with accelerometer 128 mounted to internal combustion engine 100 in a suitable location for generating a signal characteristic of the movement imparted thereon by engine knock and at least one other combustion behavior in the combustion chamber during at least a portion of the combustion cycles of the engine when a combustion event is occurring. Engine 100 includes at least one cylinder 108 (for simplicity only one cylinder is shown although the engine typically will have two or more cylinders), cylinder head 104 covering one end of cylinder 108, and piston 112, which is reciprocable within cylinder 108. Cylinder 108, cylinder head 104, and piston 112 define the general boundaries of combustion chamber 110. Various intake and exhaust valves (not shown) communicate with combustion chamber 110 to deliver a charge thereto and to remove exhaust by-products therefrom. Engine 100 may also include fuel and air delivery systems and other new or conventional systems associated with internal combustion engines.

Connecting rod 116 is attached at one end to piston 112, typically by way of piston pin 114, and at an opposite end to the bearing journal on the crank throw of crankshaft 120. To convert reciprocating motion into rotation, the crank throw provides a connecting point to crankshaft 120 for connecting rod 116 that is offset from the linear axis of rotation for crankshaft 120. Crankshaft 120 is subjected to a great deal of sideways load from each cylinder and to reduce deflection and flex, crankshaft 120 is supported by a plurality of bearings, comprising not only bearings at each end of crankshaft 120, but intermediate bearings located between piston cylinders that support crankshaft 120 from the engine block. The crankshaft bearings are known as the engine's main bearings. Heavy duty engines, which are normally associated with engines with relatively long crank throws and higher compression ratios, can employ main bearings in-between each cylinder, while engines with shorter crank throws can employ fewer intermediate main bearings between the end main bearings. A main bearing assembly comprises bearing cap 124. In the illustrated example, bearing cap 124 is joined to the rest of the main bearing assembly by four bolts 126. The main bearing assembly supports and resists deflection of crankshaft 120 by loads transmitted to crankshaft 120 from piston 112, and because of this close association between piston 112 and the main bearings, bearing cap 124 is a location where a suitably high signal-to-noise ratio can be measured by accelerometer 128, for generating a signal output that is characteristic of engine knock and at least one other combustion behavior during at least a portion of the compression and/or combustion strokes associated with combustion chamber 110. Accordingly, in the illustrated preferred embodiment of FIG. 1, accelerometer 128 is mounted to bearing cap 124.

Accelerometer 128 provides a signal output through signal wire 132 to a signal processor such as combustion quality processing system 136. In a preferred embodiment, accelerometer 128 measures the motion undergone as a result of the combustion behavior and generates a corresponding signal output that is characteristic of changes in the combustion rate for at least a portion of engine combustion cycles when combustion events are occurring. The preferred method is to process the signal output to determine combustion rate, for example as indicated by heat release rate, because it has been found that, compared to other combustion behaviors, it is easier to accurately determine combustion rate from the signal output. It is possible to further process the combustion rate data to determine other combustion behavior information such as combustion phasing, including the timing for SOC, the in-cylinder pressure including peak pressure, the occurrence of misfires, and the gross indicated mean effective pressure ("GIMEP"). While less preferred for the above-stated concerns with respect to accuracy, it is also possible to process the signal output to directly determine some of these other combustion behaviors, such as in-cylinder pressure and combustion phasing directly from the accelerometer signal output. Accordingly, because the accuracy of the combustion behavior data is important for better engine control or diagnosis, combustion rate is used herein as the preferred example of a combustion behavior that the disclosed method and apparatus can determine directly from the signal output data collected from the accelerometer.

Absent combustion, the compression of a charge of air and fuel, and the expansion associated with the subsequent piston stroke, results in a baseline profile. The combustion of the charge during the compression and combustion strokes causes deviations from this baseline profile, allowing the signal processor to determine combustion behavior characteristics such as combustion rate and combustion phasing. For example, when the signal output deviates from the baseline profile, this deviation can be attributed to combustion of the charge, and the timing for the beginning of this deviation can be correlated to the timing for SOC, and the magnitude of the deviation can be correlated to combustion behaviors such as combustion rate. If there is no significant deviation from the baseline profile, this can be an indication of misfire, or if the deviation is less than expected, an indication of partial combustion. From qualities such as the magnitude, frequency, or timing for the deviation from the baseline profile, the signal processor can detect the occurrence of engine knock.

Because the accelerometer is mounted to the engine which comprises many moving components, additional forces are also measured by the accelerometer, but forces attributable to sources other than combustion behavior are defined herein as "noise". By way of examples, sources of noise can include crankshaft vibration due to imbalance, camshaft vibration, gear meshing vibration, engine vibration due to vehicle chassis vibration, and the like. Such sources of noise produce forces that can act on the accelerometer with a much higher frequency than forces attributable to combustion behavior in the combustion chamber during the combustion cycle. The signal output generated by the accelerometer includes noise that causes oscillations in the signal voltage that mostly oscillate at a frequency that is at least an order of magnitude higher than the combustion cycle frequency. In preferred embodiments, the magnitude of such additional forces is reduced to improve the signal-to-noise ratio by selecting a location for accelerometer 128 where the amplitude of movements caused by combustion behavior are much greater than movements caused by noise. The "signal-to-noise" ratio for the signal output generated by the accelerometer is defined herein as the ratio between the signal amplitude associated with peak combustion behavior, and the signal amplitude of the oscillations attributable to noise. In preferred embodiments the signal-to-noise ratio is at least 4:1, and preferably higher, because a signal output with a higher signal-to-noise ratio can be processed to produce a filtered signal that is more accurately characteristic of combustion behavior.

Other locations on combustion engine 100 external to combustion chamber 110 can be used for mounting accelerometer 128 provided that an accelerometer mounted at that location can generate a signal output with a suitable signal-to-noise ratio. For example, other accelerometer mounting locations from which combustion quality information can be obtained include main bearing cap bolts 126, cylinder 108, cylinder head 104, or the cylinder head bolts (not shown in FIG. 1). Still other possible mounting locations for an accelerometer include a direct-injection injector, spark plug, glow plug, or any part that moves due to changes in the combustion behavior. No particular mounting location is necessarily better than all the others. It is dependant on the structural design of the engine and how well the combustion behavior information is transmitted from the combustion chamber to the mounting location. Generally, accelerometers that are more directly exposed to the motion imparted by combustion behavior are better suited for use in a combustion sensor system because more direct exposure usually yields a greater signal-to-noise ratio. Increased signal-to-noise ratios allow for simpler, more accurate, and more reliable processing methods to extract combustion information from the signal output generated by the accelerometer. Therefore, it is normally better to mount the accelerometer to a component with fewer parts in the transmission path from the combustion chamber, and with less interference from signal noise introduced through the parts in the transmission path.

Other factors for choosing a mounting location can include convenience and practicality. The type of accelerometer can also be a factor. Certain low-cost accelerometers are more susceptible to noise, and, if such an accelerometer is employed, a mounting location with a higher signal-to-noise ratio is preferred.

For engines with a bearing cap separating each pair of cylinders there are two bearing caps available for mounting accelerometers for each cylinder of the engine. It has been observed that most bearing cap/cylinder combinations provide usable combustion quality information for the neighboring cylinders. Mounting accelerometer 128 between neighboring cylinders allows for the generation of a signal comprising combustion information for at least a portion of the compression and combustion strokes of each of the neighboring cylinders. That is, because adjacent pistons normally have offset combustion cycles, and since combustion behavior only happens during the compression and combustion strokes, one accelerometer can be employed to collect combustion behavior data for two combustion chambers.

The illustrative system further includes combustion quality processing system 136 for analyzing the accelerometer signal output transmitted through signal wire 132. In preferred embodiments the signal output is processed to filter out noise and the filtered signal can then be used for a variety of purposes including combustion diagnosis, monitoring and manipulation, for example, by adjusting fuel injection timing or fuel injection quantity, and other parameters that would be appreciated by persons skilled in the technology. Improved information on the combustion behavior can be used to improve combustion quality, leading to improved performance, efficiency and/or reduced engine-out emissions.

Accelerometer 128 can be mounted to the combustion engine using a number of mounting techniques. These mounting techniques include directly securing the accelerometer to the engine; clamping the accelerometer to the engine; and indirectly securing the accelerometer to the engine via a mounting plate.

Figure 2B:
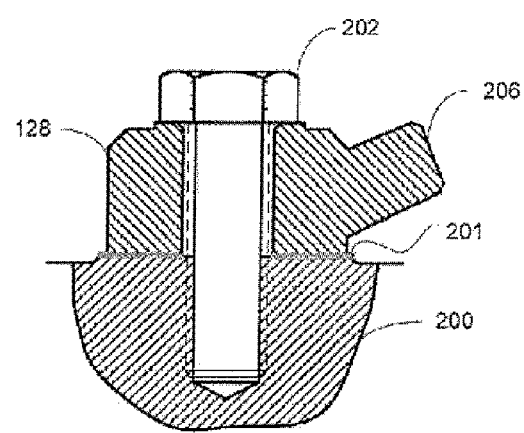
FIG. 2B shows a cross sectional view illustrating a stud/bolt mounting of an accelerometer according to one embodiment.

One method of directly securing an accelerometer to an engine is shown in the illustrative example of FIGS. 2A and 2B. Accelerometer 128 is secured to mating surface 201 on component 200 of the engine through the use of stud or bolt 202. A hole for receiving stud or bolt 202 is drilled and tapped into component 200 and the stud or bolt 202 is secured in the hole. Accelerometer 128 is then secured to stud or bolt 202 substantially flush against mating surface 201 on component 200 of the engine. This is the most direct method of secure attachment of accelerometer 128 to the engine. Accelerometer 128 has connector 206 for connection with a signal wire (not shown) which can form part of a wire harness (not shown). For best signal results mating surface 201 on engine component 200 should be made sufficiently flat, smooth, and perpendicular to the hole through machining or casting methods to enable accurate sensing of motion by accelerometer 128.

Mating surface 201 can be machined (milled) to provide a suitable surface for mating with accelerometer 128. To obtain a better signal, the limits for surface flatness should be no more than 0.002" (0.05 mm) Total Indicator Reading ("TIR"), where TIR is defined herein as the span of readings from maximum to minimum when measuring surface deviations for the whole mating surface from a desired plane. Surface roughness Rz should be at most 16 micro-inches (0.40 micrometers), where surface roughness Rz is defined herein as the sum of the height of the highest peak and the depth of the deepest valley within an individual measuring distance, in this case 0.03 inches (0.76 mm). When using the stud mounting technique, the area of mating surface 201 should have a perpendicularity in reference to the centre axis of the hole of no more than 0.002" (0.05 mm), which means that at the edge of the mating surface, the surface should be no more than this specified distance from the ideal plane. While there are different types of accelerometers that can be employed in the disclosed sensor system to generate the required signal, it has been found that relatively low-cost knock sensors can function effectively, (compared to higher-cost research-grade accelerometers). When the accelerometer is a commercially available knock sensor, these surface specifications do not change from engine to engine, location to location, or from sensor to sensor.

Care must be taken to prevent the mounting of accelerometer 128 from significantly reducing the operating life of engine component 200 on which accelerometer 128 is mounted, for example through weakening. Weakening can be caused by the introduction of higher stress concentrations, for example, around the area of the drilled hole. One solution to this problem is to create a new casting of engine component 200 with more material around the mating surface to ensure an operating life that is similar to that of the same engine component if not modified with a mating surface and stud. Alternatively, the mounting location may be selected such that the component does not exhibit a substantially reduced lifespan even though a hole has been drilled into it. This can be done by selecting a mounting location which already has an excess of material or is made of a material having a high level of structural rigidity or integrity as can be determined by one with experience in mechanical design and the design of engine components. Further, when machining the mating surface on the engine component to make it flat, it is important to remove a minimal amount of material, so as to ensure that engine component 200 maintains as much of its original structural integrity as possible.

When using stud or bolt 202 to mount accelerometer 128 to engine component 200, a detailed finite element analysis should be performed to verify the change in the stress properties of the part in response to a representative loading environment. An investigation of the fatigue characteristics can also be performed to ensure that structural integrity is maintained despite any modifications. Proper derating constants appropriate to the material, loading type, surface finish, and the like, should be used to obtain conservative strength numbers for fatigue and stress analysis. This analysis should be preformed for whatever engine part that an accelerometer is applied to, in order to implement the disclosed method. As well, if the sensor mounting type is changed (different size hole for example), before doing so, the analysis should be repeated.

For example, a structural integrity analysis was carried out with results as follows. A finite element analysis was performed to investigate the effect of drilling an 8 mm diameter and 10 mm deep hole on the top-centre of the main bearing caps of a CUMMINS® ISX™ engine. Finite element analysis was performed using Ansys® DesignSpace® 9.0; the models of the main bearing cap were generated with Pro Engineer® 2000i. A simulation was run with a bearing load equivalent to the maximum load possible due to high peak cylinder pressures. The simulation results revealed no significant change in maximum equivalent stress and total deformation. In view of at least results from the above-recited analysis, the stud mounting method on the main bearing cap was determined to be acceptable for further accelerometer-based engine control system development.

Figure 3:
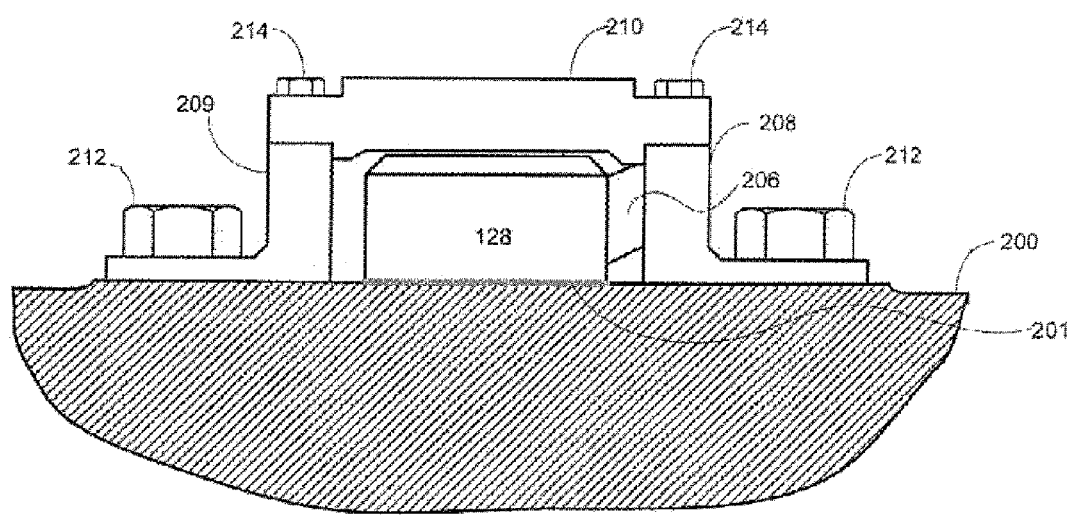
FIG. 3 shows a schematic view illustrating a clamp mounting of an accelerometer according to one embodiment.

An alternative method of mounting accelerometer 128 to an engine is illustrated in FIG. 3 where a clamp mounting method is used. This method can be implemented without requiring modifications to the engine mounting location, thus avoiding any weakening of engine component 200 that the sensor 128 is mounted to if the Clamp uses existing fasteners to secure sensor 128 to engine component 200. For example, as shown in FIG. 3, existing main bearing cap bolts 212 can be used to attach the clamp to the main bearing cap. Similar to the method outlined previously, the mating side of accelerometer 128 should be attached to a sufficiently flat and smooth mating surface 201 on engine component 200, which can be achieved though specific casting processes (such as die casting or investment casting) or machining.

FIG. 3 is an illustrative example of a clamp that has three components, including two base components 208, 209, which are held down by main bearing cap bolts 212, and clamping component 210. Sensor 128 is held down against main bearing cap 200 by clamping component 210. Clamping component 210 is bolted to base components 208, 209 using bolts 214. Other configurations are possible, as would be understood by persons skilled in the technology. An advantage of making clamp component 210 removable is that it allows for removal and reinstallation of the accelerometer 128 without removal of the main bearing cap bolts 212 (which are normally difficult to reinstall due to high tightening torque requirements).

Care must be taken to ensure that the clamp itself does not introduce additional motion to sensor 128. Accordingly, the clamp must be sufficiently rigid, particularly in the direction of the motion to be measured. If the clamp flexes, accelerometer 128 will be affected by motion associated with the flexing clamp, which could increase the signal noise, reducing the signal-to-noise ratio.

The clamp is preferably adapted for stiffness (particularly in the direction of vibration), space constraints, ease of clamp installation, adaptability to accommodate different accelerometer types, and ease of sensor replacement. Further, within the available space where sensor 128 is to be mounted, it is generally desirable to increase, the amount of material used for the clamp and the depth of clamping component 210 to increase stiffness. In preferred embodiments, if space is available and material costs are reasonable, stiffness is increased to a point where no noise is introduced into the signal output from the flexing of clamping component 210.

Figure 4A:
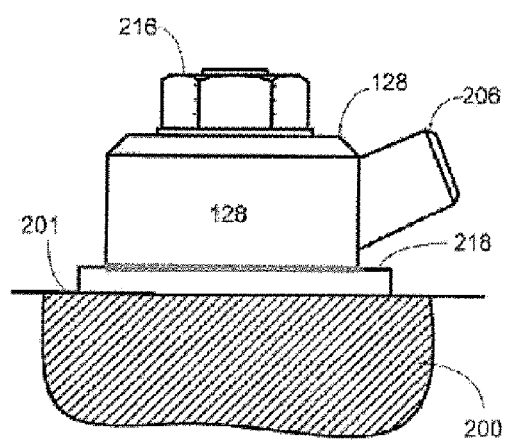
FIG. 4A shows a schematic view illustrating an indirect mounting of an accelerometer using a mounting plate according to one embodiment.
Figure 4B:
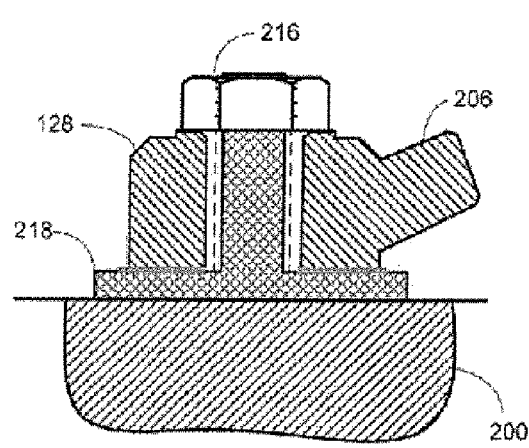
FIG. 4B shows a cross sectional view illustrating an accelerometer mounted using a mounting plate according to one embodiment.

Yet another method of attaching accelerometer 128 to engine component 200 is through the use of mounting plate 218 as illustrated in FIGS. 4A and 4B. Plate 218 comprises an integrated stud for receiving nut 216 on one side to attach to accelerometer 128. The opposite side of plate 218 is adapted for attachment to engine component 200 on mating surface 201 by known attachment methods such as welding, brazing, soldering or cementing. When using welding, brazing or soldering, thermal cooling effects should be considered. Improper and uneven cooling of engine component 200 after welding, brazing or soldering can cause warping and/or weakening of engine component 200. As well, using soldering or brazing may not achieve a bonding strength that is strong enough to securely and reliably mount accelerometer 128 to engine component 200. When cementing, through the use of epoxies or glue, consideration should be considered of the thermal and chemical environment of the mounting area. For example, exposure to high temperature motor oil may weaken the adhesive bond between mounting plate 218 and the engine component 200 if an unsuitable bonding agent is used. This method can be advantageous because there is no need for a drilled hole. As well, a machined surface on engine component 200 is not necessary, if the bond between plate 218 and engine component 218 is sufficiently secure. The mating surface of mounting plate 218 against which accelerometer 218 is held is machined to the same surface and roughness specifications that are required when mounting accelerometer 128 directly to the mating surface of engine component 200 as shown in FIGS. 2A and 2B.

Figure 5A:
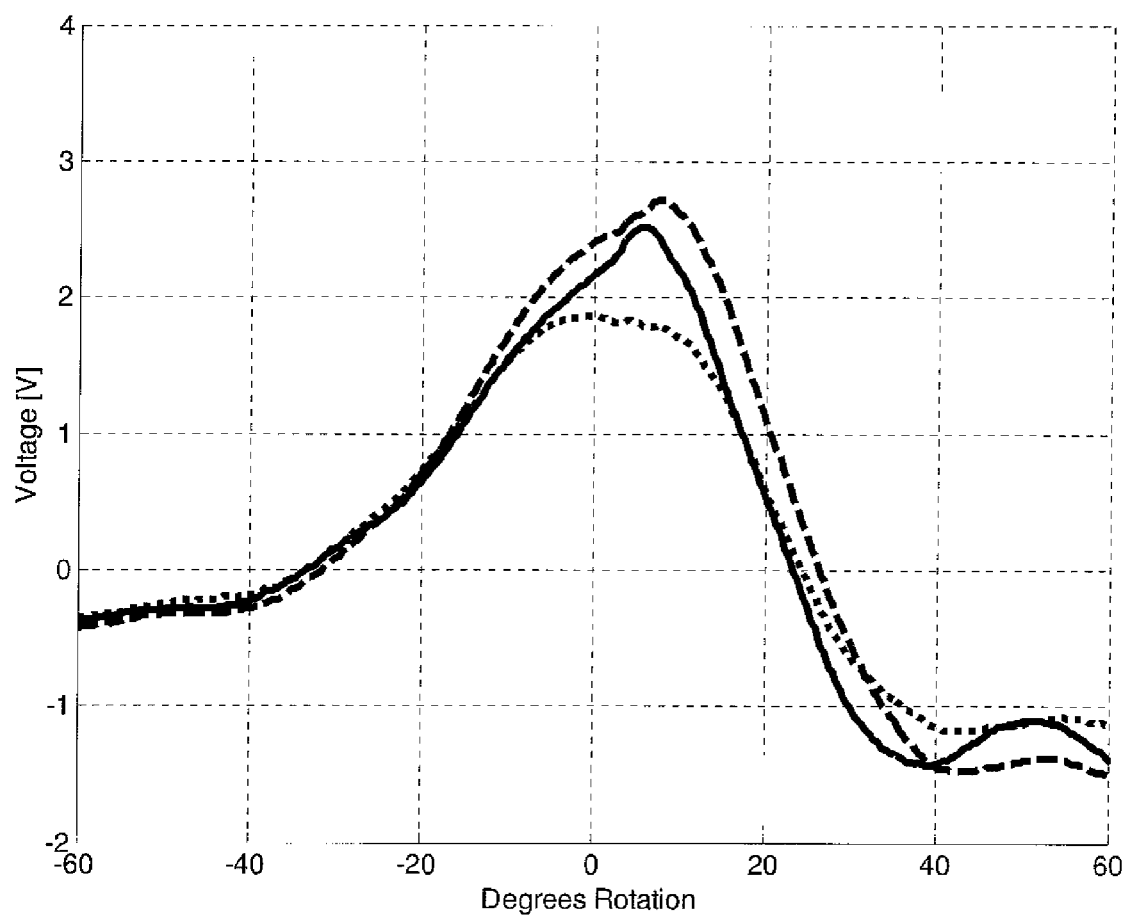
FIGS. 5A and 5B are examples of data generated from an accelerometer signal output, plotted to illustrate the difference between data collected from accelerometers mounted using two different techniques.
Figure 5B:
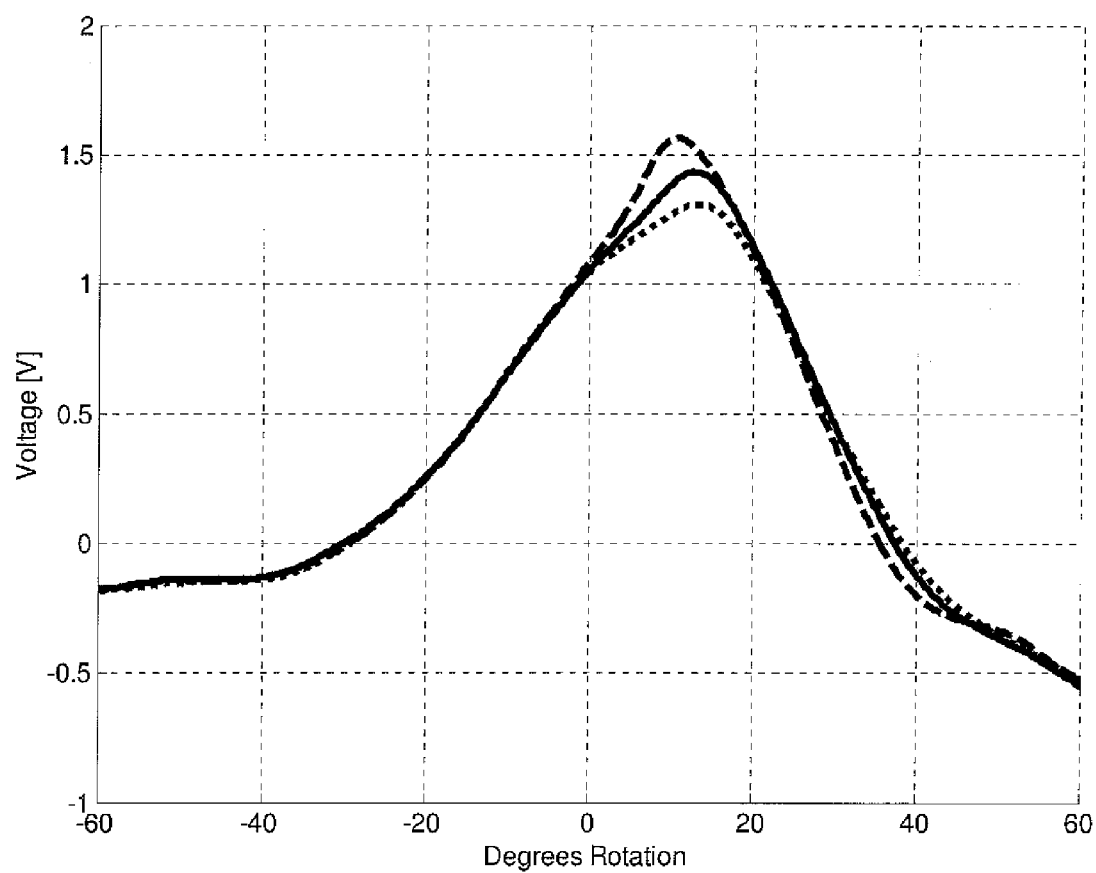

Typical sets of accelerometer data were collected from an accelerometer mounted to a main bearing cap using the clamp mounting technique and the stud mounting technique and the signal output data was processed to produce the filtered data which is plotted in FIGS. 5A and 5B, respectively. In these plots, the filtered accelerometer signal measured in volts ("V") is plotted on the vertical axis against crank angle shown in degrees of rotation after top dead center on the horizontal axis. The plotted data was collected from tests using different timing for start of combustion. The solid lines plot data collected from respective accelerometers for a nominal timing for SOC. The long-dashed line plots data collected from the same respective accelerometers when the timing for SOC was advanced, and the short-dashed line plots data collected when the timing for SOC was retarded. The differences in timing for SOC caused expected variations in the signal data when combustion occurs, but the signal data was also expected to be more consistent during the compression stroke before SOC and later in the power stroke (in these examples, after about 20 crank angle degrees after top dead center). As can be seen from the plotted data, there are more inconsistencies in the accelerometer data produced by the clamped accelerometers plotted in FIG. 5A and this is thought to be caused by flexing of the clamp. In addition, the signal strength from the clamped accelerometers is considerably higher than the stud mounted accelerometers, and this higher amplitude is thought to be caused by flexing of the clamping components. Nonetheless, the data obtained from both sensors yield data that can be used to characterize combustion behavior for at least a portion of the combustion cycle.

Signal wire 132 for transmitting the signal generated by the accelerometer to a signal processing device may be connected before or after mounting the accelerometer to the engine. The wiring harness for signal wire 132 is preferably anchored to a stationary component of the engine since excessive wire movement can introduce noise to the signal. In this context, a "stationary" component is defined as engine an component such as crankcase 122, cylinder block 108, cylinder head 104, and main bearing cap 124 which are non-moving in relation to "moving" components such as piston 112, which reciprocates, and crankshaft 120, which rotates. That is, for greater certainty, by this definition, stationary components include components that can vibrate or, if the engine is mounted in a vehicle, components that move with the engine as a whole. For example, if sensor 128 is mounted to the body of main bearing cap 124, the wiring harness is preferably securely mounted inside crankcase 122 to the body of main bearing cap 124 and crankcase 122. It is preferable that brackets, conduits, metal p-clips (rubber coated), grommets, or other known fastener types be used to securely mount the wire to the engine block. For wires mounted in the crankcase near where the crankshaft is rotating or at other locations on the engine near moving parts, in addition to reducing signal noise, it is equally important to anchor the wires to prevent interference with the moving parts. Securely mounting the harness will also ensure that the connector on the sensor will not excessively vibrate and generate noise or come loose and cut-off the signal entirely. For improved durability, persons skilled in the technology will understand that the embodiment shown by FIG. 1 is a schematic illustration and that sharp bends in signal wire 132 are preferably avoided wherever possible. For example, the radii of bends in signal wire 132 should not be less than the diameter of the wire itself. Harness mounting that reduces vibration of the signal wires and of the connector on the sensor is important for producing a signal with a higher signal-to-noise ratio.

Other aspects that should be considered when designing a harness used to transmit the accelerometer electrical signal from accelerometer 128 to combustion quality processing system 136 include, selecting the material properties of the harness wiring, such as resistance and capacitance, so that the accelerometer electrical signal is not adversely filtered or attenuated. Because the disclosed system preferably employs a plurality of accelerometers, each with respective signal wires 132 leading from a respective sensor to combustion quality processing system 136, signal wires 132 can be designed in such a way that the accelerometer electrical signal from each respective accelerometer 128 on the engine is affected, for example filtered and/or attenuated, in a similar manner. For example, in preferred embodiments, the length of each one of the plurality of signal wires 132 is the same.

In each of the mounting methods outlined above, a thin application of a viscous liquid, for example a light lubricant, such as silicone grease, can be applied between a contact surface of the accelerometer and the mating surface of the engine component to facilitate proper location and orientation of the accelerometer. The viscous liquid preferably has a viscosity of at least 2500 centipoise at 20 degrees Celsius and is stable in the operating environment at the mating surface. Such liquids improve transmissibility of movements to the accelerometer, filling voids with nearly incompressible fluid and thereby increasing compressive stiffness of the joint. This is particularly important for measurements at higher frequencies, at which any changes in the resonant frequency of the system have a significant effect on measurements.

Connector 206 is preferably positioned to be substantially parallel to the main bearing cap axis of symmetry, within 3-5 degrees, and pointing toward the wiring harness connector. Mounting bolts or nuts may then be tightened to the desired torque, for example 20 Nm. The wiring harness connector can then be connected to the accelerometer and a suitable signal processing device, including, for example, an oscilloscope. The installation of the accelerometer may then be tested by causing movement of the accelerometer. Sometimes, if testing shows that the accelerometer is not functioning to produce a signal representative of its movement, this can be corrected by removing the accelerometer, reversing the wire connections to the pins, and then re-mounting it.

The tightening torque on the accelerometer, also referred to as the loading of the accelerometer is important. Sensor mounting technique and surface preparation can affect the amplitude-frequency response of the measurement, particularly at high frequencies. Care should be taken to ensure a flush mating with a smooth, flat surface. Nicks, scratches, or other deformations of the mounting surface or the sensor can affect frequency response. Surface conditions should be prepared to the tolerances outlined above.

When selecting a suitable mounting location and method, it should be noted that the signal-to-noise ratio may increased by doing any one or a combination of the following: a) selecting an accelerometer position that ensures a sufficient signal-to-noise ratio, b) ensuring a secure connection of the accelerometer to the mounting location surface, c) applying a viscous liquid to the mating surface to fill in small voids between the sensor and the mating surface at mounting location to increase stiffness of the connection, d) ensuring the cable is securely fastened to stationary components of the engine since cable movement can cause noise, e) shielding the cable by enclosing the cable in a conductive sheath or by utilizing a cable with integrated shielding to reduce the affect of electromagnetic noise, f) ensuring that the cable connections to the sensor are secure (an accelerometer with an integrated cable can be preferred to keep the connection away from any harsh vibrations that may be present at the point of measurement).

Sensor Re-Mount

Figure 6A:
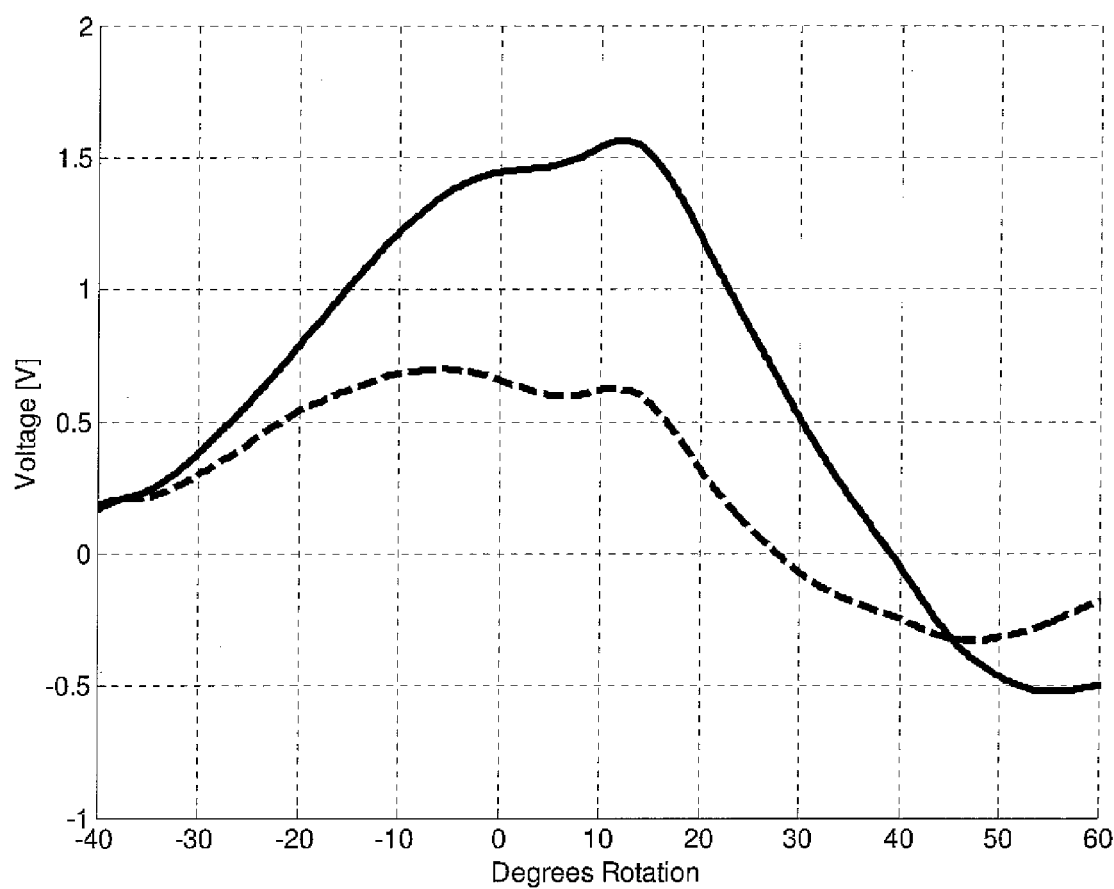
FIGS. 6A and 6B are examples of data generated from an accelerometer signal output, plotted to illustrate the difference between data collected from an incorrectly and a correctly re-mounted accelerometer.
Figure 6B:
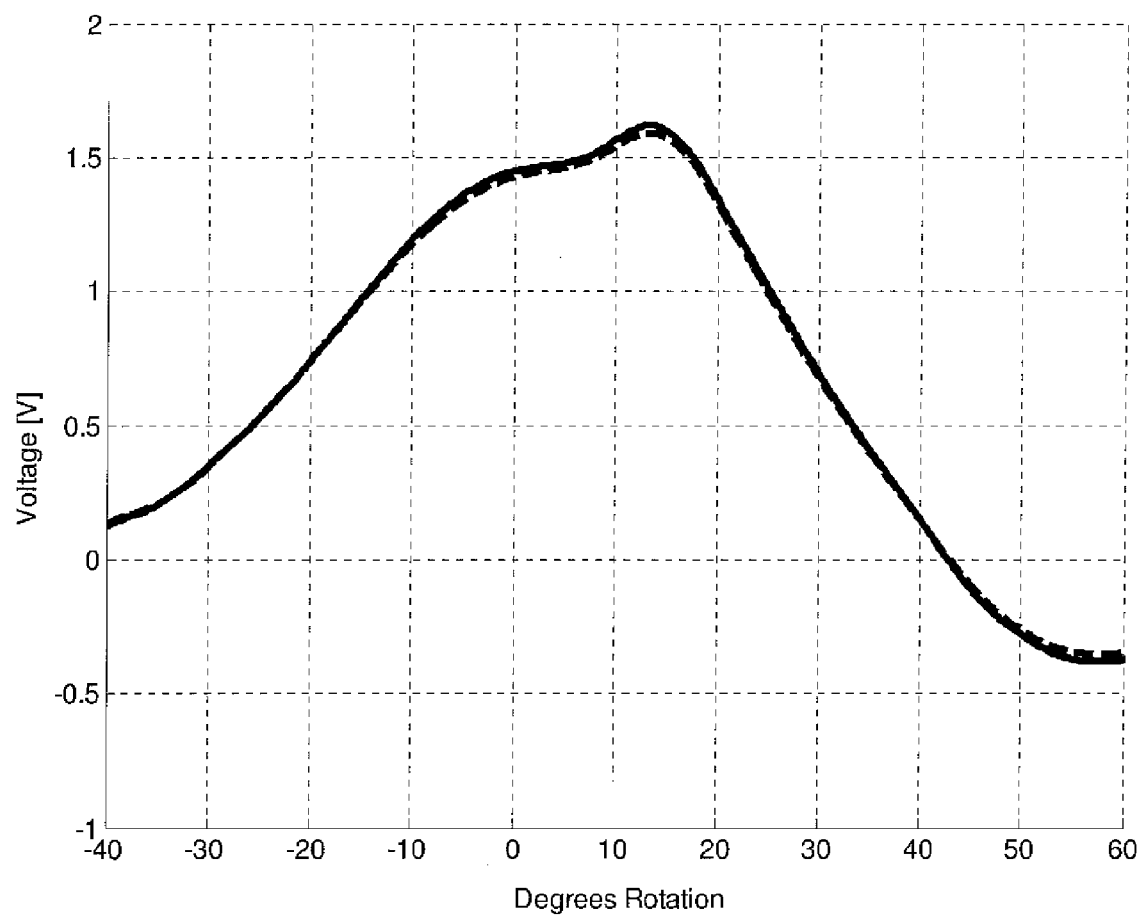

Occasionally it may be necessary to remove and re-mount an accelerometer, for example if an accelerometer needs to be replaced or if the engine component to which the sensor is attached needs to be disassembled or replaced. FIGS. 6A and 6B show that a re-mounted sensor can produce consistent signal characteristics if the same method used to originally mount the sensor are followed when re-mounting the sensor. Like in FIGS. 5A and 5B, accelerometer signal measured in volts ("V") shown on the vertical scale is plotted against degrees of crank angle rotation shown on the horizontal scale as degrees after top dead center. In FIGS. 6A and 6B the solid lines plot the original accelerometer signal and the dashed lines plot the data from the accelerometer after re-mounting. FIG. 6A shows that imprecisely re-mounting an accelerometer can lead to significantly inconsistent signal acquisition following re-mounting. Problems that can be introduced by re-mounting include, without limitation: a) not ensuring that the same preload torque is applied (+/−10%); b) not ensuring that the sensor is in the same orientation (i.e. cable/connector should be facing in the same direction and angle); and, c) not ensuring that there is absolutely no debris in between the mounting surfaces of the sensor and the engine component to which it is mated. Some methods of increasing signal consistency between mount and re-mount of the sensor include: (a) application of a thin layer of a viscous liquid, such as a light lubricant, to fill small voids with a nearly incompressible fluid, to improve transmissibility, and increase compressive stiffness of the joint; and, (b) bridging the terminals of the accelerometer after installation if a knock sensor with a piezoelectric element is used to discharge the voltage created from the compressive preload force (not discharging may cause a bias voltage to appear at the data acquisition device). For comparison with the data plotted in FIG. 6A, the repeatability of data associated with correctly re-mounted accelerometers is shown in FIG. 6B. Accordingly, to ensure a consistent signal output, the steps for re-mounting an accelerometer should duplicate the steps originally followed to initially mount the accelerometer, including applying the same preload torque, bridging the terminals to discharge voltage created from the compressive preload force on accelerometers that employ a piezoelectric element, and each of the steps employed to increase signal-to-noise ratio. The only difference between the steps for mounting and re-mounting an accelerometer is that when mounting an accelerometer to an engine component for the first time, there is no requirement to match the steps of a previous installation, whereas when re-mounting an accelerometer or replacing an accelerometer with a new accelerometer, in the preferred method the installation steps include all of the steps following in the previous mounting, in addition to matching the orientation of the previously installed accelerometer.

Accelerometers are typically designed to measure acceleration in one direction only. There may be leakage from other directions, which is more common for production-type accelerometers than research grade sensors. In theory, rotation of an accelerometer within the same plane on a main bearing cap or other suitable mounting location should not affect the resulting signal. However, rotation of the accelerometer should be reduced, and preferably prevented, to eliminate this as a source for introducing inconsistency in the generated signal. Another reason for not changing the rotation of the accelerometer is that changing the orientation of the connector can cause the connector or the signal wires to interfere with moving components near the accelerometer mounting location, such as the crank shaft if the accelerometer is mounted to, or near, the main bearing caps.

The original tightening torque or preload torque on the accelerometer, also referred to as the loading of the accelerometer should be maintained during re-mount of the sensor. Transducer mounting technique and surface preparation can affect the amplitude-frequency response of the measurement, particularly at high frequencies. As outlined above with respect to mounting methods, care should be taken to ensure a substantially flush mating between the sensor mounting surface and the mating surface, or between the sensor mounting surface and the mounting plate.

Sensor Redundancy

A number of different engine configurations exist including inline, V and flat cylinder configurations. Accelerometers can be used to collect data from each cylinder of an internal combustion engine for the generation of a data set reflecting the engine's combustion behavior and/or characteristics. Because the timing for the combustion cycles of neighboring cylinders is offset, a single accelerometer may be used to collect data from neighboring cylinders when placed in a suitable position between two neighboring cylinders, for example on the main bearing cap between them. In a preferred arrangement, by locating an accelerometer between each set of neighboring cylinders, data for the inner cylinders is collected by at least a second accelerometer. As such, the collected data may be cross referenced against one another to ensure and/or increase precision and accuracy of the data collected. In preferred embodiments at least two accelerometers are positioned to produce a signal characteristic of combustion behavior in each piston cylinder. The signal processor that receives the signal outputs from the accelerometers is programmed to identify and match the combustion behavior data to each cylinder. If combustion behavior data is collected for one cylinder from more than one accelerometer, the signal processor is programmed to combine the signal outputs matched to each cylinder, filter noise from the combustion behavior data, and produce a combined signal.

Figure 7:
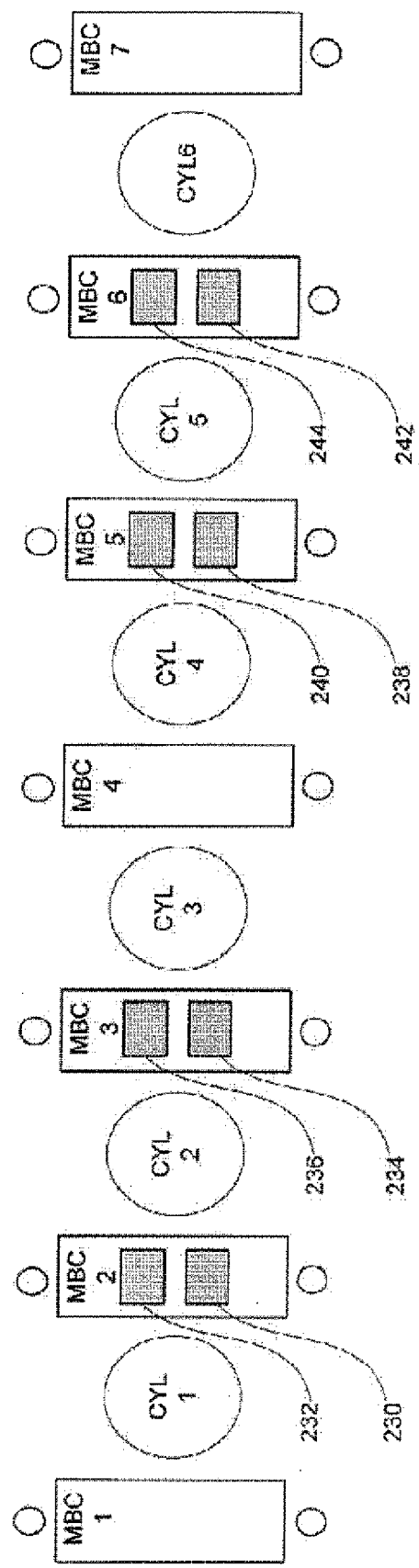
FIG. 7 is a schematic view illustrating an example of the placement of accelerometers on a combustion engine.

The ability to continue to collect data for all cylinders should one accelerometer fail is advantageous for any combustion measurement system as it increases robustness. FIG. 7 is a schematic view that shows an example of the placement of accelerometers on a 6 cylinder combustion engine with sensor redundancy for each cylinder. While the illustrated arrangement is described with reference to the 6 cylinders of an inline-6 engine the same arrangement could be used for a crankshaft connected to the two 6 cylinder banks of a V-12 engine. In FIG. 7, the relative locations of the main bearing caps MBC 1, MBC 2, MBC 3, MBC 4, MBC 5, MBC 6 and MBC 7, cylinders CYL 1, CYL 2, CYL 3, CYL 4, CYL 5 and CYL 6 and accelerometers 230, 232, 234, 236, 238, 240, 242 and 244 are shown. In this example, eight accelerometers are employed to collect data representative of the combustion characteristics associated with the six cylinders. For example, with the illustrated arrangement, movement caused by combustion in cylinder CYL 1 can be measured by accelerometers 230 and 232 mounted on main bearing cap MBC 2. Movement caused by combustion in cylinders CYL 2 and CYL 3 can be measured by accelerometers 234 and 236, which are mounted on main bearing cap MBC 3. Movement caused by combustion in cylinders CYL 4 and CYL 5 can be measured by accelerometers 238 and 240 mounted on main bearing cap MBC 5. Movement caused by combustion in cylinder CYL 6 can be measured by accelerometers 242 and 244 mounted on main bearing cap MBC 6.

In a less preferred, but still operative embodiment, only three accelerometers can be employed, with one mounted on each of MBC2, MBC4 and MBC6. With this less preferred embodiment each accelerometer is positioned on a bearing cap between two piston cylinders so that the combustion behavior in each piston cylinder can be monitored by one accelerometer that is mounted to an adjacent bearing cap. This arrangement is less preferred because there is no sensor redundancy. For collecting combustion behavior data that is used for engine control and diagnosis, it is preferred that there be redundant signals for improved accuracy and robustness, should one of the accelerometers fail. For a six-cylinder engine, to provide signal redundancy, with a high signal-to-noise ratio by locating the sensors on the bearing caps next to the associated piston cylinder, the lowest number of accelerometers that could be used is six, for example, with two accelerometers on each of MBC2, MBC4 and MBC6. Any or all of the main bearing caps can be used to mount one or more accelerometers provided that enough clearance is available and a suitable signal-to-noise ratio is observed at the selected location.

Vibrations of the engine component to which the accelerometer is mounted introduce noise into the signal output emitted from the accelerometer. Vibrations with a frequency much higher than the combustion cycle frequency are easier to filter from the signal output compared to lower frequency vibrations which are closer to the frequency of the combustion cycle. If such low frequency vibrations are observed, this can negatively influence the accuracy of the accelerometer signal. Accordingly, if low frequency vibrations are observed in association with a particular engine component, it is preferable to mount the accelerometer on another engine component where low frequency vibrations are not observed and where there is a suitable signal-to-noise ratio.

While particular elements and embodiments of the present invention have been shown and described, it will be understood, of course, that the invention is not limited thereto since modifications can be made by those skilled in the art without departing from the scope of the present disclosure, particularly in light of the foregoing teachings.

What is claimed is:

1. A method of mounting an accelerometer to an internal combustion engine, the method comprising the steps of:
    (a) securing the accelerometer to a mating surface on an engine component, the mating surface being external to a combustion chamber of the engine and located where the accelerometer can generate a signal output that is characteristic of engine knock when it occurs and at least one other combustion behavior inside the combustion chamber during at least a portion of a compression stroke or a combustion stroke associated with the combustion chamber;
    (b) connecting a signal wire at one end to the accelerometer and at an opposite end to a signal processor; and
    (c) increasing the signal output's signal-to-noise ratio by taking at least one of the following steps:
        adapting the mating surface on the engine component to have a surface flatness of no more that 0.002 inches (0.05 millimeters) Total Indicator Reading;
        adapting the mating surface on the engine component to have a surface roughness Rz of no more than 16 micro-inches (0.40 micrometers);
        anchoring the signal wire to stationary components of the engine, to reduce signal noise that might otherwise be generated by movement of the signal wire;
        shielding the signal wire using a conductive sheath or integrated shielding to reduce signal noise; and
        applying a viscous liquid between the accelerometer and the mating surface before securing the accelerometer and filling voids therebetween with the viscous liquid, thereby increasing stiffness of the connection when the accelerometer is secured to the mating surface.

2. The method of claim 1 wherein the combustion chamber is one of a plurality of combustion chambers and the method further comprises securing a plurality of accelerometers to respective mating surfaces, with each one of the mating surfaces being external to the plurality of combustion chambers and being located where each one of the respective accelerometers can generate a signal output that is characteristic of the combustion behavior inside at least one of the plurality of combustion chambers.

3. The method of claim 2 further comprising locating at least two accelerometers where they can each generate a respective signal output that is characteristic of the combustion behavior inside one of the plurality of combustion chambers during combustion cycles, and programming the signal processor: to receive a plurality of signal outputs and match combustion behavior data from each one of the plurality of signal outputs to associated ones of the plurality of combustion chambers; and, to produce a combined signal for at least one of the plurality of combustion chambers, by combining combustion behavior data from respective ones of the plurality of signal outputs that are matched to the same combustion chamber.

4. The method of claim 2 further comprising packaging a plurality of signal wires in a wiring harness wherein one end of each one of the plurality of signal wires is connected to the signal processor and at the other end is connected to one of the plurality of accelerometers.

5. The method of claim 1 further comprising following all of the steps to increase signal-to-noise ratio that are set out in paragraph (c) of claim 1.

6. The method of claim 1 wherein the signal processor differentiates engine knock from other combustion behaviors by detecting a characteristic frequency associated with engine knock or by detecting a timing for start of combustion that is in a predetermined range characteristic of engine knock.

7. The method of claim 1 wherein the at least one combustion behavior of which the signal output is characteristic, is selected from the group consisting of combustion rate, combustion phasing and gross indicated mean effective pressure.

8. The method of claim 7 further comprising programming the signal processor to determine a first combustion behavior directly from the signal output and to determine a second combustion behavior from the first combustion behavior.

9. The method of claim 8 wherein the first combustion behavior is combustion rate.

10. The method of claim 1, wherein the step of securing the accelerometer to the engine component comprises securing the accelerometer to one of the engine's main bearing caps or one of the engine's main bearing cap bolts.

11. The method of claim 10 further comprising orienting a signal wire connector of the accelerometer to be substantially parallel to the main bearing cap axis of symmetry and pointing toward a connector for the signal wire.

12. The method of claim 1 wherein the step of securing the accelerometer to the engine component comprises securing the accelerometer to a cylinder head of the engine or to a cylinder head bolt.

13. The method of claim 1 wherein the step of securing the accelerometer to the engine component comprises securing the accelerometer to a cylinder block of the engine.

14. The method of claim 1 further comprising securing the accelerometer to the engine component by:
    boring a hole in the engine component through the mating surface;
    securing a stud in the hole;
    securing the accelerometer against the mating surface of the component with the stud.

15. The method of claim 14 further comprising adapting the mating surface of the component to have a perpendicularity in reference to the centre axis of the hole of no more than 0.002 inches (0.05 millimeters).

16. The method of claim 14, further comprising tapping the hole and wherein the stud is a bolt having threads matched to threads of the tapped hole.

17. The method of claim 14 further comprising manufacturing the engine component with more material around the mating surface so that boring the hole does not weaken the engine component, as compared to an unmodified like engine component that does not have a bore with a stud installed in it.

18. The method of claim 14 wherein securing the accelerometer to the engine component comprises securing the accelerometer to one of: the main bearings; the main bearing bolts; the cylinder head; the cylinder head bolts; and, the cylinder block.

19. The method of claim 1 wherein the step of securing the accelerometer to the engine component comprises clamping the accelerometer against the mating surface of the engine component.

20. The method of claim 19 further comprising locating the mating surface near existing fasteners or a second engine component that can be used to secure a clamp to the engine component and the accelerometer between a clamping member of the clamp and the mating surface.

21. The method of clam 20 further comprising manufacturing the clamp with at least one base member that is attachable to the engine component by the existing fastener or the second engine component, and the clamping member is removably attached to the base member so that the accelerometer can be mounted and removed without removing the existing fasteners or the second engine component.

22. The method of claim 20 further comprising selecting bolts that attach a main bearing cap to a main bearing assembly as the existing fasteners that secure the clamp to the engine component.

23. The method of claim 20 further comprising selecting a cylinder head of the engine to be the engine component to which the accelerometer is mounted, and selecting an engine component that is mounted to the cylinder head as the other engine component that is used to secure the clamp to the cylinder head.

24. The method of claim 23 further comprising selecting one of a fuel injection valve, a spark plug and a glow plug, as the second component which is used to secure the clamp to the cylinder head.

25. The method of claim 1 wherein the step of securing the accelerometer to the engine component comprises:

securing a mounting plate to the mating surface of the engine component, the mounting plate having a component-side that is securable to the mating surface of the engine component and an accelerometer-side that is securable to the accelerometer; and securing the accelerometer to the sensor-side of the mounting plate.

26. The method of claim 25 further comprising manufacturing the accelerometer-side of the mounting plate to have an accelerometer mating surface and an integrated stud for receiving and attaching the accelerometer to the mounting plate.

27. The method of claim 26 further comprising adapting the accelerometer mating surface of the mounting plate to have a perpendicularity in reference to the centre axis of the integrated stud of no more than 0.002 inches (0.05 millimeters).

28. The method of claim 25, further comprising securing the mounting plate to the mating surface of the engine component by welding, brazing, soldering or cementing.

29. The method of claim 1 wherein when following the step of anchoring the signal wire to stationary components of the engine, the method further comprises using brackets, conduits or p-clips to anchor the signal wire to the stationary component.

30. The method of claim 1 wherein when following the step of applying viscous liquid between the mating surface and the accelerometer, selecting as the viscous liquid a lubricant that is stable for the environment where it is applied.

31. The method of claim 1 wherein when following the step of applying viscous liquid between the mating surface and the accelerometer, selecting a viscous liquid with a viscosity of at least 2500 centipoise at 20° C.

32. The method of claim 1 wherein when re-mounting the accelerometer, following the same steps that were followed to mount or previously re-mount the accelerometer.

33. The method of claim 32 wherein when re-mounting the accelerometer, the method further comprises matching the same orientation for the accelerometer that it had when it was previously mounted.

34. The method of claim 1 wherein the signal output is a voltage signal generated by a piezoelectric element that is a component of the accelerometer.

35. The method of claim 34, wherein when mounting or re-mounting the accelerometer, the method further comprises bridging the terminals of the accelerometer after securing the accelerometer against the mating surface of the engine component to discharge the voltage created from the compressive preload force on the piezoelectric element.

36. A method of operating and controlling an internal combustion engine the method comprising the steps of:

(a) securing an accelerometer to a mating surface on an engine component, the mating surface being external to a combustion chamber of the engine and located where the accelerometer can generate a signal output that is characteristic of engine knock when it occurs and at least one other combustion behavior inside the combustion chamber during at least a portion of a compression stroke or a combustion stroke associated with the combustion chamber;

(b) connecting a signal wire at one end to the accelerometer and at an opposite end to a signal processor;

(c) increasing the signal output's signal-to-noise ratio by taking at least one of the following steps:

adapting the mating surface on the engine component to have a surface flatness of no more that 0.002 inches (0.05 millimeters) Total Indicator Reading;

adapting the mating surface on the engine component to have a surface roughness Rz of no more than 16 micro-inches (0.40 micrometers);

anchoring the signal wire to stationary components of the engine, to reduce signal noise that might otherwise be generated by movement of the signal wire;

shielding the signal wire using a conductive sheath or integrated shielding to reduce signal noise; and applying a viscous liquid between the accelerometer and the mating surface before securing the accelerometer and filling voids therebetween with the viscous liquid, thereby increasing stiffness of the connection when the accelerometer is secured to the mating surface; and (d) using the accelerometer to generate a signal output that is characteristic of engine knock when it occurs and the at least one other combustion behavior inside the combustion chamber during at least a portion of a combustion event associated with the combustion chamber and using information that is collected from the signal output to control or diagnose operation of the engine.

37. An internal combustion engine comprising:

(a) an accelerometer secured to a mating surface of an engine component, wherein the mating surface is external to a combustion chamber of the engine and located where the accelerometer can generate a signal output that is characteristic of engine knock when it occurs and at least one other combustion behavior inside the combustion chamber during at least a portion of a compression stroke or a combustion stroke associated with the combustion chamber, wherein the mating surface is machined to have a flatness and a surface roughness that increases the signal output's signal-to-noise ratio;

(b) a signal processor that can receive and process the signal output generated by the accelerometer to detect engine knock when it occurs and the at least one other combustion behavior; and (c) a signal wire connected at one end to the accelerometer and at an opposite end to the signal processor.

38. The internal combustion engine of claim 37 wherein the accelerometer is one of a plurality of accelerometers that are secured to respective mating surfaces and each one of the accelerometers has a signal wire connected at one end thereto and at the opposite end to the signal processor.

39. The internal combustion engine of claim 37 wherein the signal wire is shielded to reduce signal noise.

40. The internal combustion engine of claim 37 wherein the signal wire is anchored to stationary components of the engine to reduce movement of the signal wire during operation of the engine.

41. The internal combustion engine of claim 37 wherein the signal processor is programmable to filter at least some noise from the signal output, resulting in a filtered signal that is more accurately characteristic of the at least one combustion behavior.

42. The internal combustion engine of claim 37 wherein the at least one combustion behavior that is determined from the signal output is selected from the group consisting of combustion rate, combustion phasing, and gross indicated mean effective pressure.

43. The internal combustion engine of claim 37 wherein the signal processor is programmed to estimate the timing for start of combustion from the signal output or from the combustion behavior determined from the signal output.

44. The internal combustion engine of claim 37 wherein the mating surface has a surface flatness of no more that 0.002 inches (0.05 millimeters) Total Indicator Reading and a surface roughness Rz of no more than 16 micro-inches (0.40 micrometers).

45. The internal combustion engine of claim 37 wherein the engine component with the mating surface is a main bearing cap or a main bearing cap bolt.

46. The internal combustion engine of claim 37 wherein the engine component with the mating surface is a cylinder head of the engine or a cylinder head bolt.

47. The internal combustion engine of claim 37 wherein the engine component with the mating surface is a cylinder block of the engine.

48. The internal combustion engine of claim 37 further comprising a stud that secures the accelerometer to the mating surface.

49. The internal combustion engine of claim 48 wherein the mating surface of the component has a perpendicularity in reference to the centre axis of the stud of no more than 0.002 inches (0.05 millimeters).

50. The internal combustion engine of claim 37 further comprising a clamp that secures the accelerometer to the mating surface.

51. The internal combustion engine of claim 50 wherein existing fasteners that fasten the engine component to the engine are used to attach the clamp to the engine component.

52. The internal combustion engine of claim 51 wherein the fasteners are main bearing cap bolts that join a main bearing cap to a main bearing assembly.

53. The internal combustion engine of claim 51 wherein the fasteners are cylinder head bolts that attach a cylinder head to a cylinder block.

54. The internal combustion engine of claim 50 wherein the clamp is secured to the engine component by a second engine component that is associated with the combustion chamber.

55. The internal combustion engine of claim 54 wherein the engine component with the mating surface is a cylinder head and the second engine component is selected from the group consisting of fuel injectors, spark plugs and glow plugs.

56. The internal combustion engine of claim 50 wherein the clamp comprises a removable clamping member wherein the accelerometer can be mounted, removed, and re-mounted without unsecuring base members of the clamp from the engine component with the mating surface.

57. The internal combustion engine of claim 37 further comprising a mounting plate disposed between the mating surface and the accelerometer.

58. The internal combustion engine of claim 57 wherein the mounting plate is secured to the mating surface by welding, brazing, soldering or cementing.

59. The internal combustion engine of claim 37 further comprising brackets, conduit or p-clips that anchor the signal wire to stationary components of the engine.

60. The internal combustion engine of claim 37 further comprising a viscous liquid with a viscosity of at least 2500 centipoise at 20° C. disposed between the accelerometer and the mating surface, whereby small voids there between are filled and connection stiffness is increased.

61. The internal combustion engine of claim 60 wherein the viscous liquid is a lubricant that is stable in the operating environment at the mating surface.

* * * * *